| United States Patent [19] | [11] Patent Number: 4,877,165 |
| Behrle | [45] Date of Patent: Oct. 31, 1989 |

[54] FISHING ROD HOLDER

[76] Inventor: William L. Behrle, 385 Grand Terrace Ct., Fenton, Mo. 63026

[21] Appl. No.: 208,727

[22] Filed: Jun. 20, 1988

[51] Int. Cl.⁴ .................... B60R 11/00; A01K 97/10
[52] U.S. Cl. .................... 224/42.45 R; 224/922; 43/21.2; 43/25
[58] Field of Search .................... 43/21.2, 25; 224/42.45 R, 922, 907; 114/364, 351; 248/316.7, 302, 534, 536

[56] References Cited

U.S. PATENT DOCUMENTS

| 898,898 | 9/1908 | Kahn | 248/302 X |
| 1,277,479 | 9/1918 | Ritchie | 248/229 |
| 1,283,511 | 11/1918 | Heidtmann | 224/922 X |
| 1,321,842 | 11/1919 | Otto | 248/302 X |
| 2,459,549 | 1/1949 | Smith | 43/21.2 X |
| 2,566,496 | 9/1951 | Montane | 248/534 X |
| 2,810,982 | 10/1957 | Bucciarelli | 43/25 |
| 3,367,056 | 2/1968 | Johnson | 224/922 X |
| 3,533,181 | 10/1970 | Kniskern | 43/25 |
| 3,749,294 | 7/1973 | Johnston | 224/907 X |
| 3,968,912 | 7/1976 | Horwitz | 224/42.46 R |
| 4,739,575 | 4/1988 | Behrle | 43/21.2 |

FOREIGN PATENT DOCUMENTS 1553055 12/1968 France .................... 43/21.2

Primary Examiner—Henry J. Recla
Assistant Examiner—Daniel Stein Freer
Attorney, Agent, or Firm—Rogers, Howell & Haferkamp

[57] ABSTRACT

A fishing rod holder having a tubular receptacle to receive the shank of the rod holding device, the tubular receptacle being notched to accommodate a nodule on the fishing rod holder device to prevent its rotation about the axis of the tube, the tubular receptacle being welded to a hose clamp that can be readily secured about a horizontal rail member about the gunwales of a boat. A reinforcing strip is secured across the hose clamp to prevent its being pulled apart.

2 Claims, 1 Drawing Sheet

U.S. Patent
Oct. 31, 1989
4,877,165
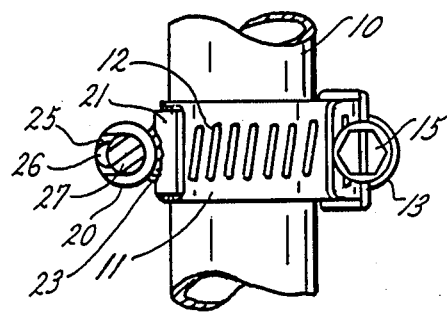
FIG. 3.
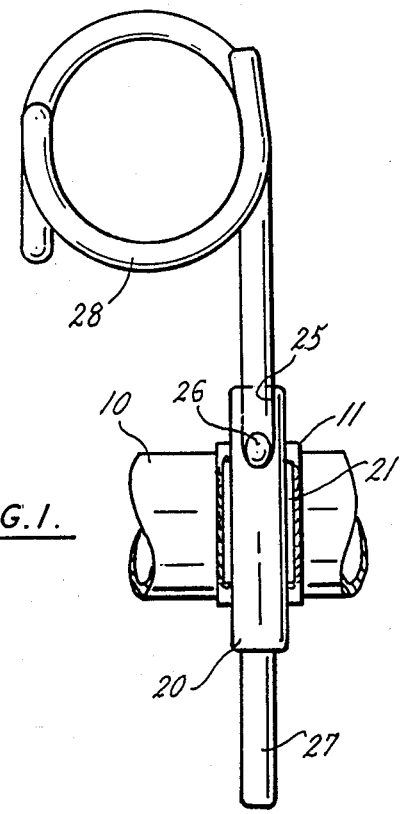
FIG. 1.
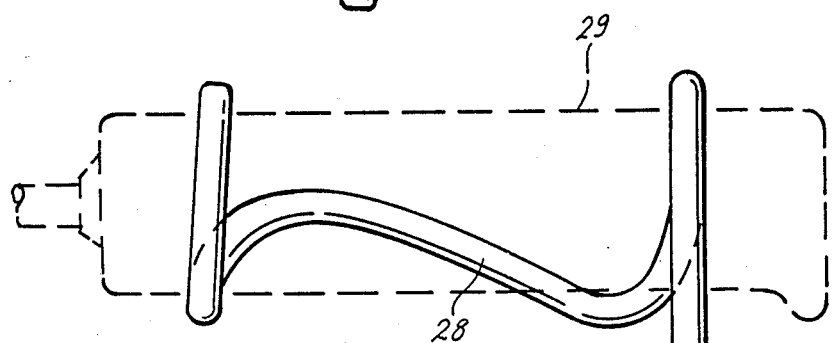
FIG. 2.
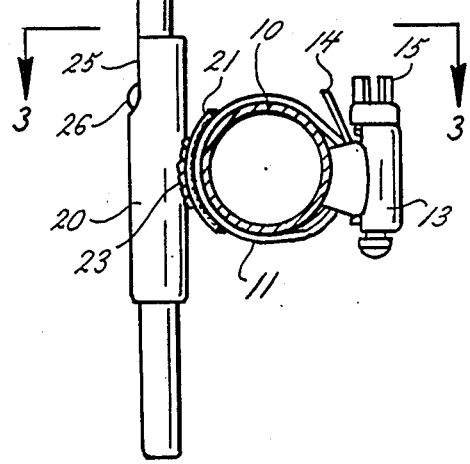

FISHING ROD HOLDER

SUMMARY OF THE INVENTION

This invention consists of a tubular receptacle welded or otherwise united to a hose clamp that is adjustably attachable to a cylindrical member, and particularly to a cylindrical member such as a rail provided about the gunwales of a boat.

In order to prevent the breaking of the hose clamp as a result of its being tightened about a cylindrical member, a strip is secured to the hose clamp at the area of attachment of the tube.

Thus the tubular receptacle for a fishing rod support may be attached to a cylindrical member, particularly to a horizontally disposed one, and can be tightened in such a manner as to dispose the tubular receptacle and hence the fishing rod holder at any desired angle.

BACKGROUND OF THE INVENTION

Other devices of this same general category have been disclosed and some of them have been patented by the applicant. Reference is therefore made to the following patents by the applicant, viz., 4,565,025, issued 1/21/86; 4,669,214, issued 6/2/87; and 4,739,575, issued 4/26/88, and to the art cited therein.

The latest of the above patents, namely, No. 4,739,575, shows a C-clamp arrangement. This can be used on a rail of a boat but it is costly to make compared to the present invention, it is heavier and therefore more difficult to carry when in the tackle box, and is less versatile because of the fact that its shape prevents it from use in certain cases.

Among prior patents is Ferguson 1,719,695. This, however, would not be satisfactorily attachable to the horizontal rail on the boat. In the first place, the tube is there vertically arranged and must have a special attachment to the boat which is entirely different from that of the present invention. Furthermore, the collars 18 are not adjustable but must be secured in place by the thumb screws 19.

Applicant's prior patent No. 4,669,214, for example, shows a belt which a buckle having a tube fastened to the buckle. This, however, is not an arrangement that would be at all satisfactory for securing the tubular member such as the tubular member 12 of that patent to the horizontal cylindrical rail on a boat. In the first place, the belt itself differs from the present clamp in not being so tightly arranged about the human body as is possible with the present hose clamp. Furthermore, the arrangement of my prior patent provides for an axis of the tubular member that is parallel to the vertical axis of a human body. In the present device, the axis of the tubular member is transverse to the rail of the boat.

Goldberg's Marine advertisement shown in its 1978 Discount Accessory Catalog shows a number of different kinds of tubular receptacles that are attachable to boats for holding fishing rods or the like. None of these has a tubular receptacle that is attached by a hose clamp or the like, and in all of them the attachments are apparently for attaching the tubes vertically to the sides of a boat rather than to a horizontally-disposed tubular receptacle.

The present invention thus accomplishes an important utility with maximum simplicity and minimum cost. It does not require special knowledge or special equipment of the type of Ferguson, or of the devices shown in the Goldberg Marine Catalog. It has the great virtue of simplicity because the operation and mounting and adjustment of the hose clamp is very well known. It is inexpensive and it is light in weight, so that when it is not in use, it can be in a tackle box without taking up any great room or requiring any significant addition to weight.

IN THE DRAWINGS

FIG. 1 is a side elevation of the present arrangement with the fishing rod holder inserted in the vertical receptacle that is attached to the horizontal cylindrical pipe member;

FIG. 2 is a view taken from the right side of FIG. 1, the pipe being shown in section; and FIG. 3 is a section of the line 3—3 of FIG. 2.

DESCRIPTION OF PREFERRED EMBODIMENT

Many boats are equipped with a cylindrical rail such as 10 that extends horizontally around near the gunwale of the boat. A metallic hose clamp 11 having a series of slots 12 is wrapped around the pipe 10. It has a conventional screw-type tightening element 13 receiving the ends of the strap portion of the clamp 11, as shown in FIG. 2, with the one end 14 shown as projecting outwardly. This end is the one that is drawn tightly by the screw 15 that meshes with the slots 12.

There is a tubular receptacle 20 that is attached to the strap 11. Preferably a strip 21 is located between the tube and the strap 11 so as to prevent the breaking of the strap when it is tightened. The weld or soldering connection 23 tends to stiffen the strap and could cause it to break because of the slits 12. The strip 21 is in turn welded to the strap 11.

The tubular receptacle 20 has a notch 25 that accommodates a bump or nodule 26 on the shank 27 of a rod holder 28. The fishing rod 29 is indicated in dashed lines.

IN USE

The operator winds the strap 11 about the pipe 10 and feeds the end 14 of the strap through the screw fitting 13. The screw 15 is then turned to draw the strap 11 about the pipe 10. When the tube 20 is in the appropriate position or angle to the vertical so as to dispose the fishing pole as desired by the user, the screw 15 is tightened, securing the tube 20 fixedly in place. The shank 27 of the fishing pole holder 28 is then inserted into the tubular receptacle 20 and the nodule 26 is slipped into the slot 25 so that it prevents swivelling about the axis of the tube 20. Other such notches may be employed in the upper part of the tubular receptacle if desired.

It is thus that a very simple and readily made type of clamping device is provided for holding a fishing rod holder onto a horizontal pipe-like member. Its operation is very familiar because of the type of hose fitting that it embodies; yet it is adjustable to suit different sizes of pipes and can accommodate different dispositions of the strap on the pipe to position it to provide for having the fishing pole extend at different angles.

There are various changes and modifications which may be made to the invention as would be apparent to those skilled in the art. However, these changes or modifications are included in the teaching of the disclosure, and it is intended that the invention be limited only by the scope of the claims appended hereto.

I claim:

1. A fishing rod holder comprising a hose clamp type of strap having substantially annular inner and outer surfaces and a tubular receptacle having a first end, an opposite end, and substantially annular inner and outer surfaces, for receiving the shank of a fishing rod holder member, the hose clamp type of strap including means securely attaching said strap to a support extending in a first direction, such as a horizontal direction, the tubular receptacle being disposed transversely to the axis of the hose clamp, such as in a vertical direction, there being a strip of metal between said outer surfaces of the tubular receptacle and the strap and tightly bonded to both and through which the tubular receptacle is attached to the strap at the outside thereof, the tubular receptacle having a notch in said first end, and a fishing rod holder member having a shank with a nodule thereon, removably inserted into the tubular receptacle with the nodule engaging within the notch.

2. The fishing rod holder of claim 1 wherein said attaching means comprises a metal slotted strip at one end of said strap and a screw member at the opposite end of said strap engageable in the slots such that turning the screw member tightens or loosens the strap and with the tubular receptacle attached to the outside surface of the strap, but spaced from the screw arrangement.

* * * * *